(12) United States Patent  
Bodebratt et al.

(10) Patent No.: US 8,881,621 B2  
(45) Date of Patent: Nov. 11, 2014

(54) STEERING WHEEL ASSEMBLY

(75) Inventors: Daniel Bodebratt, Göteborg (SE); Anders Sandberg, Göteborg (SE)

(73) Assignee: Volvo Car Corporation, Gothenburg (SE)

( * ) Notice: Subject to any disclaimer, the term of this patent is extended or adjusted under 35 U.S.C. 154(b) by 146 days.

(21) Appl. No.: 13/024,636

(22) Filed: Feb. 10, 2011

(65) Prior Publication Data

US 2011/0197701 A1   Aug. 18, 2011

(30) Foreign Application Priority Data

Feb. 16, 2010 (EP) .................................. 10153666

(51) Int. Cl.
| | | |
|---|---|---|
| *G05G 1/10* | (2006.01) | |
| *B62D 1/06* | (2006.01) | |
| *B62D 1/04* | (2006.01) | |

(52) U.S. Cl.  
CPC ... *B62D 1/06* (2013.01); *B62D 1/04* (2013.01)  
USPC .............................................. 74/558

(58) Field of Classification Search  
USPC ...................................... 74/552, 558, 558.5  
See application file for complete search history.

(56) References Cited

U.S. PATENT DOCUMENTS

| | | | | |
|---|---|---|---|---|
| 5,761,968 A | * | 6/1998 | Poteet ............................. | 74/558 |
| 6,668,682 B1 | * | 12/2003 | Emeneth et al. ................ | 74/552 |
| 2002/0005082 A1 | * | 1/2002 | Suzuki et al. ................... | 74/552 |
| 2002/0139221 A1 | | 10/2002 | Chang | |
| 2003/0037634 A1 | * | 2/2003 | Ward ............................ | 74/558 |
| 2006/0236807 A1 | * | 10/2006 | Yasuda et al. ................... | 74/552 |
| 2009/0255367 A1 | * | 10/2009 | Tajiri ............................ | 74/552 |
| 2010/0071502 A1 | * | 3/2010 | Yasuda et al. ................... | 74/552 |
| 2010/0139448 A1 | * | 6/2010 | Kim et al. ....................... | 74/552 |

FOREIGN PATENT DOCUMENTS

| | | | | |
|---|---|---|---|---|
| DE | 3633558 A1 | * | 4/1987 | ............... B62D 1/04 |
| DE | 10101010 A1 | | 7/2002 | |
| DE | 20303767 U1 | | 7/2003 | |

OTHER PUBLICATIONS

European Search Report for corresponding Application No. 10153666.2, mailed Jul. 8, 2010, 7 pages.

* cited by examiner

*Primary Examiner* — Vicky Johnson  
(74) *Attorney, Agent, or Firm* — Brooks Kushman P.C.

(57) ABSTRACT

A steering wheel assembly having an armature, a hub, a wheel rim skeleton, and at least one spoke connecting the hub with the wheel rim skeleton. The assembly may include a rim interface component attachable to the wheel rim skeleton. The assembly may further include an insert component, which is attachable to the wheel rim skeleton and/or the hub, and the rim interface component and the insert component being exchangeable independently of each other.

8 Claims, 4 Drawing Sheets

STEERING WHEEL ASSEMBLY

CROSS-REFERENCE TO RELATED APPLICATIONS

This application claims foreign priority benefits under 35 U.S.C. §119(a)-(d) to EP 10153666.2, filed Feb. 16, 2010, which is hereby incorporated by reference in its entirety.

TECHNICAL FIELD

The present invention relates to a steering wheel assembly and a system for steering wheel engineering.

BACKGROUND OF THE INVENTION

The steering wheel is a clearly visible part of a vehicle. The design of the steering wheel may influence the whole impression of a vehicle. The design of the steering wheel further influences the grip of the steering wheel and the whole feeling when driving. The steering wheel may for example be used to give a feeling of luxury or sport. The steering wheel may function as a means to personalize the vehicle, especially if the owner/driver/user of the vehicle can make a selection between many different steering wheels. Sometimes, it also desirable to be able to exchange the steering wheel of a used vehicle, e.g. when shifting owner. The customer thus wants to be able to choose from a wide selection of different steering wheels. There is therefore a desire from the standpoint of the vehicle manufacturer or dealer to be able to offer as many steering wheel variants as possible to the customer.

On the other hand, having a wide selection of different steering wheels also has disadvantages for the manufacturer or dealer, such as development, production, storage and handling costs. From a cost efficiency point of view, there is therefore an opposite desire to have as few different steering wheels variants as possible.

Document DE 203 03 767 U1 discloses a steering wheel, wherein a cover is detachably attached to the steering wheel. The visual impression of the steering wheel is decided by the choice of cover.

SUMMARY OF THE INVENTION

One object of the present invention is to overcome or ameliorate at least one of the disadvantages of the prior art, or to provide a useful alternative.

It is desirable to be able to give each customer a selection of different steering wheels, while being able to keep storage and handling costs low.

It is further desirable to give the customer a possibility to make a customized choice of steering wheel.

It also desirable to provide a possibility to exchange at least part of the steering wheel in a used vehicle, e.g. when shifting owner to reflect the new owner's preferences.

It is still also desirable to provide a system for steering wheel engineering offering a wide selection of different steering wheels, while keeping development and/or production costs down.

In a first aspect of the present invention there is provided a steering wheel assembly comprising an armature comprising a hub, a wheel rim skeleton, and at least one spoke connecting the hub with the wheel rim skeleton; and a rim interface component attachable to the wheel rim skeleton; wherein the steering wheel assembly further comprises an insert component, which is attachable to the wheel rim skeleton and/or the hub, and wherein the rim interface component and the insert component are exchangeable independently of each other.

Thereby the customer can be offered a wide selection of different steering wheels, at the same time as costs for development, production, storage and/or handling is kept low, as compared to prior art solutions.

Since the rim interface component and the insert component are separate parts, they can be exchanged independently of each other. By independently is further meant that a certain rim interface component fits with more than one insert component and vice versa.

By a component being attachable is meant that the component may be directly or indirectly attached. The rim interface component may be attached directly to the wheel rim skeleton, for example by snap fit or by fastening means such as screws or bolts. It may also be indirectly attached to the wheel rim skeleton by means of an intermediate part. The steering wheel may for example be surrounded by a foamed sheath, and in that case the rim interface component may be attached to the foamed sheath. The intermediate part may also be used for varying the diameter of the steering wheel rim. In a similar way, the insert component may be directly or indirectly attachable to the wheel rim skeleton and/or the hub. Snap fit or fastening means may be used. Intermediate parts may be used. The insert component may be attached to the rim interface component, which in turn is attached to the wheel rim skeleton.

Optionally, the rim interface component and the insert component may be attached to the armature in order to form the steering wheel assembly at production or in a workshop. In the same way, it is also possible that a workshop makes the exchange of the rim interface component and/or the insert component in a used vehicle. For vehicles equipped with airbag in the steering wheel, it is advisable to take care, so that the function of the airbag is not disturbed, when exchanging the rim interface component and/or the insert component. It may also be possible for the customer to exchange the rim interface component and/or the insert component himself/ herself.

In one embodiment, the rim interface component and the insert component can be attached/released from the rest of the steering wheel assembly on their own, i.e. one component at the time.

In another embodiment, the rim interface component and the insert component are attached/released from the armature together as one unit and then decoupled from each other. In that case the exchange of one or both components is done before coupling them together and once again attaching them to the armature as one unit.

Optionally the rim interface component and/or the insert component are/is visible, as seen when the steering wheel assembly is in use, i.e. as seen from a driver's or passenger's point of view. Both the rim interface component and the insert component may be visible, as seen when the steering wheel assembly is in use.

In an embodiment the rim interface component and/or the insert component essentially covers the wheel rim skeleton, as seen when the steering wheel assembly being in use. Thereby, the wheel rim skeleton is normally not seen. Therefore the wheel rim skeleton can be engineered to have the desired mechanical properties, while the rim interface component and/or the insert component provides the desired visual impression and the grip properties.

In an embodiment, the rim interface component and the insert component have geometrically complementary shapes.

By complementary shapes is meant that their geometrical shapes match each other, such that they fit side by side, when attached in the steering wheel assembly. In one embodiment, the rim interface component and the insert component together form at least part of the rim surface of the steering wheel assembly, or even substantially the whole rim surface of the steering wheel assembly. Side by side in that case relates to side by side on the rim of the steering wheel assembly. Since they fit side by side, there are no interspaces, neither any overlap. In another embodiment, side by side may relate to the insert component being attached between the wheel rim and the hub.

In an alternative embodiment, the geometrical shapes of the rim interface component and the insert component may allow at least partial overlap, e.g. the insert component being attached at least partly on top of the rim interface component or vice versa. Also in this embodiment, the rim interface component and the insert component may together form at least part of the rim surface of the steering wheel assembly, or even substantially the whole rim surface of the steering wheel assembly.

The insert component may form at least one extra spoke, but there may also be variants without an extra spoke. As examples 0, 1, 2 or 3 extra spokes may be formed by the insert component. At least one of the extra spokes of the insert component may at least partly cover a spoke of the armature.

The rim interface component may be used to give the steering wheel assembly a special look, e.g. by choice of material, such as leather, wood or polymer, or design, such as sport look.

In an embodiment of the steering wheel assembly according to the invention, the rim interface component and the insert component together form substantially the whole rim surface of the steering wheel assembly, as seen when the steering wheel assembly being in use. The rim interface component and the insert component may together cover the whole circumference of the rim. In an alternative embodiment, the rim interface component itself forms substantially the whole rim surface of the steering wheel assembly.

The insert component may form at least 2%, preferably at least 5% and most preferably at least 10% of the rim surface of the steering wheel assembly, as seen when the steering wheel assembly being in use.

The rim interface component may be formed from several parts, although preferably only one part is used. The rim interface component, if only one is used, or the rim interface components together, if more than one are used, may form between 50% and 100%, preferably between 65% and 98% and most preferably between 80% and 95% of the rim surface of the steering wheel assembly, as seen when the steering wheel assembly being in use.

In an embodiment, the rim interface component may form substantially the whole rim surface of the steering wheel assembly with the insert component being attachable between the rim interface component and the hub of the steering wheel assembly.

The insert component and/or the rim interface component may at least partly cover the hub. In that case, the geometry should preferably, if needed, be prepared for an airbag being mounted on the hub.

The hub may comprise at least one protrusion for facilitating the attachment of the optional at least one extra spoke.

In one aspect of the present invention there is provided an insert component for use in a steering wheel assembly according to above.

In one aspect of the present invention there is provided a rim interface component for use in a steering wheel assembly according to above.

In one aspect of the present invention there is provided a system for steering wheel assembly engineering, the system comprising i armature variants, i being a positive integer j rim interface component variants, j being a positive integer, each of the armature variants comprising a hub, a wheel rim skeleton, and at least one spoke connecting the hub with the wheel rim skeleton, and the rim interface component variants being attachable to the wheel rim skeleton, wherein the system further comprises k insert component variants, k being a positive integer, the insert component variants being attachable to the wheel rim skeleton and/or the hub. A selected steering wheel assembly is formed by combining one armature variant with at least one rim interface component variant and at least one insert component variant. The armature variants, the rim interface component variants and the insert component variants have such geometrical shapes, that an armature variant is combinable with more than one rim interface component variant and/or more than one insert component variant in order to form the selected steering wheel assembly. As mentioned above the rim interface component and the insert component may be directly and/or indirectly attached.

In an embodiment of the system for steering wheel engineering, a rim interface component variant is combinable with more than one insert component variant.

In an embodiment of the system for steering wheel engineering, an insert component variant is combinable with more than one rim interface component variant.

In an embodiment of the system for steering wheel engineering, any of the rim interface component variants is combinable with any of the insert component variants, giving j times k different combinations.

BRIEF DESCRIPTION OF THE DRAWINGS

The present invention will hereinafter be further explained by means of non-limiting examples with reference to the appended figures wherein.

DETAILED DESCRIPTION OF THE PREFERRED EMBODIMENT(S)

The invention will, in the following, be exemplified by embodiments. It should however be realized that the embodiments are included in order to explain principles of the invention and not to limit the scope of the invention, defined by the appended claims. Details from two or more of the embodiments may be combined with each other. The suggested steering wheels may be used in vehicles or vessels, such as cars, buses, trucks, lorries, ships or boats.

Figure 1:
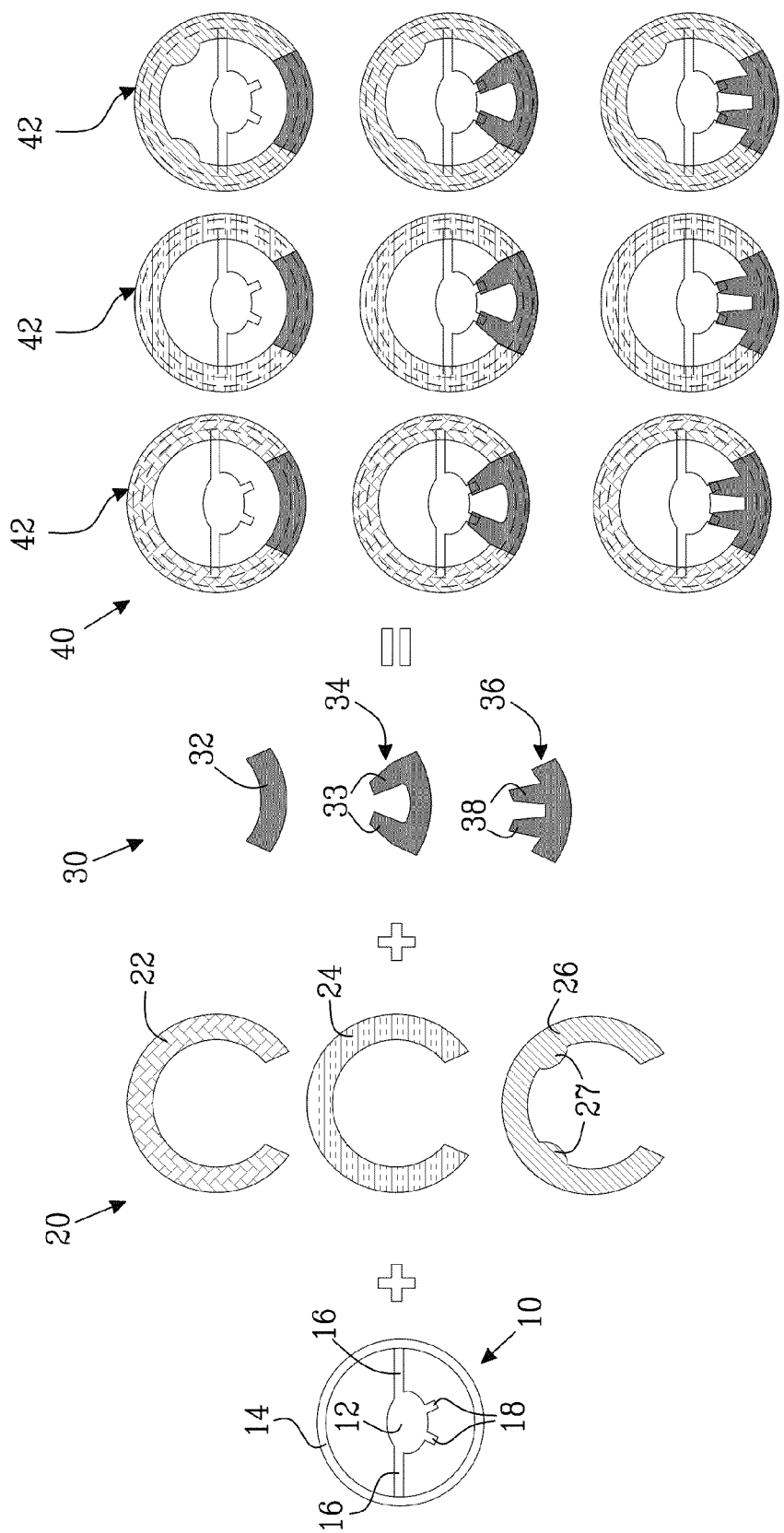
FIG. 1 is a system for steering wheel engineering according to a first embodiment of the invention.

FIG. 1 schematically illustrates an exemplary system for steering wheel engineering according to a first embodiment of the invention. The number of different combinations is therefore kept low in the example in order to explain the principle. A steering wheel assembly 40 comprises an armature 10, a rim interface component 20 and an insert component 30. The armature 10 comprises a hub 12, a wheel rim skeleton 14, and at least one spoke 16 connecting said hub 12 with the wheel rim skeleton 14. In FIG. 1, two spokes 16 are used. In this example, the customer can choose between three rim interface component variants 20: wood 22, leather 24 or sport 26. The sport variant 26 may be anatomically formed and may have bulbs 27 with a greater width. The rim interface component 20 covers most of the rim surface 42 of said steering wheel assembly 40, as seen when said steering wheel assembly being in use, i.e. as seen from a driver's or passenger's point of view. In FIG. 1, and purely as an example, it covers about 85%. The rest of the rim surface 42 of the steering wheel 40 is in this embodiment covered by an insert component 30. As seen in FIG. 1, the insert component 30 may, purely as an example, have no extra spoke 32, two extra spokes 34 or one extra spoke 36 comprising two members 38. Any one of the insert components 30 may fit together with any one of the rim interface components 20. In that way, 1×3×3=9 different steering wheel variants 40 may be formed out of 1+3+3=7 different components 10, 20, 30.

Moreover, as can be gleaned from FIG. 1, the hub 12 comprises two protrusions 18. This is an option for facilitating the attachment of extra spokes 33. In many steering wheel assemblies, the hub 12 is to be covered by an airbag (not illustrated) and therefore the hub 12 is not visible. Since the airbag may also cover the protrusions 18, even for the insert component 32 with no extra spoke, the protrusions 18 are consequently not seen in the steering wheel assembly being in use in the vehicle.

Figures 2, 3, 4:
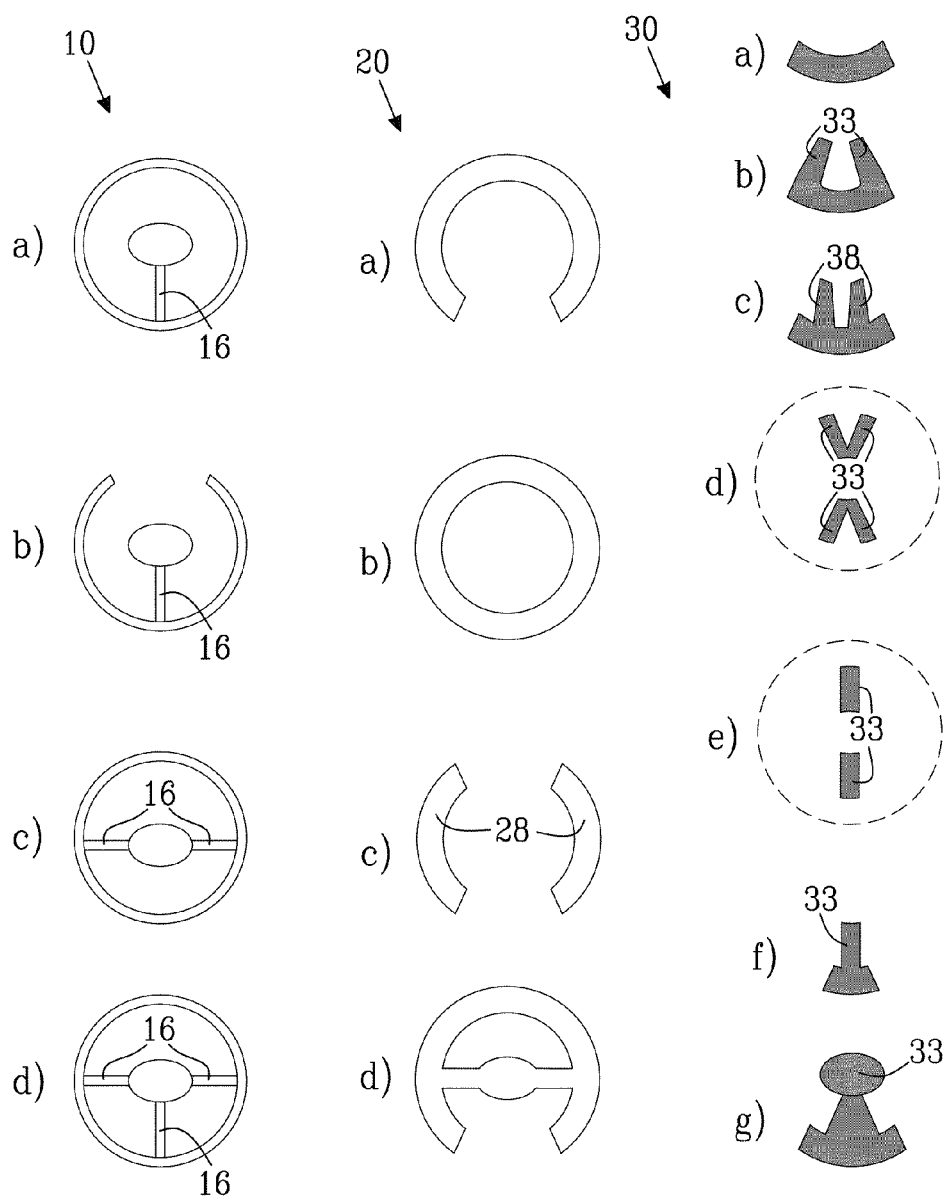
FIG. 2 illustrates a number of armature variants.
FIG. 3 illustrates a number of rim interface component variants.
FIG. 4 illustrates a number of insert component variants.

In FIG. 2, a number of different armatures 10 are illustrated. Armature a) has one spoke 16 and a closed circumference. Armature b) has one spoke 16 and an open circumference. Armature c) has two spokes 16 and a closed circumference. Armature d) has three spokes 16 and a closed circumference. Any number of spokes 16 may be combined with either an open or closed circumference. For most steering wheels of ordinary vehicles, such as standard cars, the circumference is closed and generally circular, but the steering wheel may also have other geometrical shapes, such as butterfly shape or rectangular with rounded corners. Further, armature variants may be made having different diameters. The hub 12 may have at least one protrusion 18 for facilitating attachment of possible extra spokes of the insert component 20, as exemplified by FIG. 1. Typical materials for the armature 10 are metals or alloys, e.g. steel, magnesium, aluminium, or polymeric materials.

FIG. 3 illustrates a number of different rim interface components 20. The rim interface component of a) covers about ⅚ of the rim surface 42 of the steering wheel, while b) covers the whole rim surface 42 of the steering wheel. The variant c) comprises two members 28. The rim interface component 20 may cover an arbitrary portion of the rim surface 42 of the steering wheel assembly 40. It may comprise one, two, three or more members 28. Further, and not illustrated, there may be variants having different widths of the rim and/or comprising different materials, such as leather, wood or polymeric material. There may also be variants, wherein the rim is formed to have a varying width along the circumference, such as the extra bulbs 27 used for the sport variant 26 of FIG. 1. It is also possible to have ergonomically formed rim interface components 20. The rim interface component 20 may essentially totally cover the wheel rim skeleton 14, such that a user of the vehicle will normally not see the wheel rim skeleton 14, such as in variant b). The rim interface component 20 may further also cover the spokes 16 and/or the hub 12 as in variant d). In that case, rim interface components 20 should preferably, if needed, be prepared for an airbag being mounted on the hub 12. Since properties such as material, width, possible extra bulbs 27, may be varied independently of each other, a great number of different variants may be used.

The insert components 30 may form extra spokes 33 as shown in FIG. 4. The variant a) forms no extra spoke, while variant b) forms two extra spokes 33. Variant c) illustrates a spoke formed by two members 38, which are so close together that they are seen by the user as being only one spoke. Variants d) and e) are suitable to use together with a rim interface component 20 covering the whole rim surface 42 of the steering wheel, such as in FIG. 3b), since the may be attached between the rim interface component 20 and the hub 12. A steering wheel assembly 40 may comprise more than one insert component 30. It could for example have two of variant f), each with one extra spoke 33. If using a rim interface component 20 as in FIG. 2a), the two insert components of variant f) may be placed next to each other. Alternatively, when using a rim interface component 20 as in FIG. 2c) the two insert components of variant f) may be placed opposite each other. The insert component variant 30 may also cover the hub 12 as in variant g). In that case, the insert component variant should preferably, if needed, be prepared for an airbag being mounted on the hub 12. Properties such as material, width, number of extra spokes, may be varied independently of each other, giving rise to a great number of different variants.

Preferably, essentially the whole the wheel rim skeleton 14 is covered by the rim interface component 20 or by the rim interface component 20 together with the insert component 30, such that a user of the vehicle will normally not see the wheel rim skeleton 14.

A system for steering wheel assembly engineering may comprise
    i armature variants 10, 110, 210,
    j rim interface component variants 20, 120, 220,
    k insert component variants 30, 130, 230,
each of i, j, k being a positive integer {1, 2, 3, 4, 5, 6 . . . }.
    In FIG. 2, i=4. In FIG. 3, j=4. In FIG. 4, k=7.

For cost reasons it is normally preferred to keep the number i of armature variants in a certain system for steering wheel assembly engineering low, since it is rather expensive to develop and produce different armature variants. Therefore i may be between 1 and 5, preferably between 1 and 3 and most preferably between 1 and 2. A preferred embodiment using 2 armature variants may have one with small diameter and one with large diameter.

It is relatively inexpensive to develop and produce different interface component variants, as compared to the armature variants. Therefore j may be between 1 and 20, preferably between 2 and 15, and most preferably between 3 and 10. As mentioned above in conjunction with FIG. 3, properties such as material, width, possible extra bulbs 27, may be varied independently of each other.

It is also relatively inexpensive to develop and produce different interface component variants, as compared to the armature variants. Therefore k may be between 1 and 20, preferably between 2 and 15, and most preferably between 3 and 10. Properties such as material, width, no of extra spokes, may be varied independently of each other, giving rise to a great number of different variants.

The theoretical highest number of combinations of the system is i×j×k, that is i times j times k. For a system comprising the variants of FIGS. 2-4 the theoretical highest number is 4×4×7=112. The total number of components is i+j+k. For FIGS. 2-4: 4+4+7=15. However, all combinations are not suitable and sometimes not even feasible. For example, rim interface component a) is suitably combined with any of insert components a)-c), g) or two of f), such that a closed circumference is achieved, but it is not suitable to combine rim interface component a) with any of insert components d)-f), since then the wheel rim skeleton 14 would partly be visible.

As long as the number of feasible combinations are higher than the total number of components i+j+k, the number of different articles to be handled or stored is lower with the suggested system for steering wheel engineering according to the invention as compared to storing and handling whole steering wheels. Even if the number of feasible combinations would be lower than the total number of components i+j+k, it may still be worthwhile to use the system according to the invention, since individual articles are smaller and lighter than whole steering wheels. Moreover, the system may still provide a cost-efficient solution, even if the number of feasible combinations would be lower than the total number of components i+j+k, since the number i of armature variants may be kept low, while still offering a selection of steering wheels to the customer.

As long as j×k is less than j+k, the number of different articles to be handled or stored is lower with the suggested system for steering wheel engineering according to the invention as compared to storing and handling unitary covers as suggested by prior art.

Figure 5:
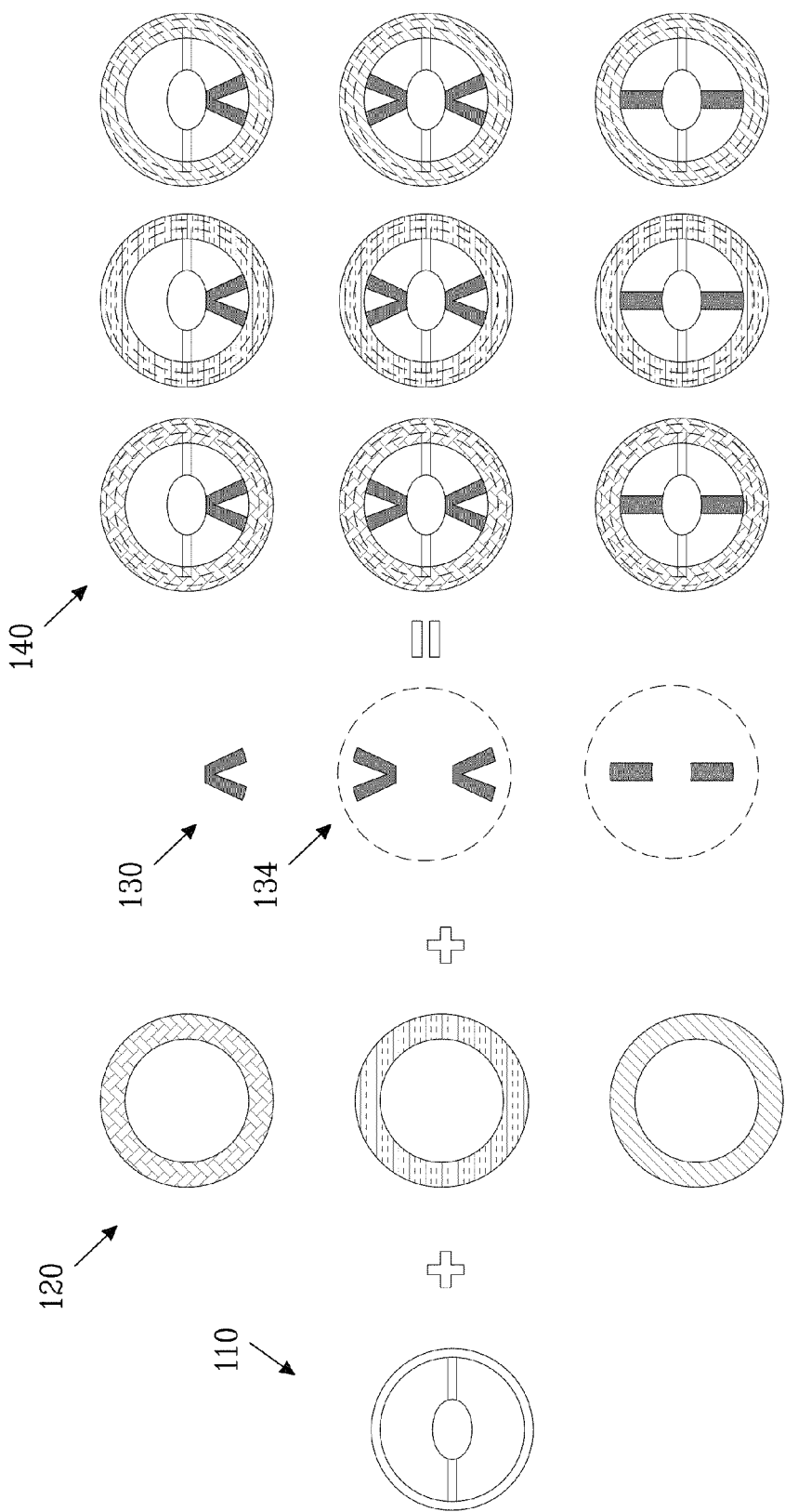
FIG. 5 is a system for steering wheel engineering according to a second embodiment of the invention.
Figure 6:
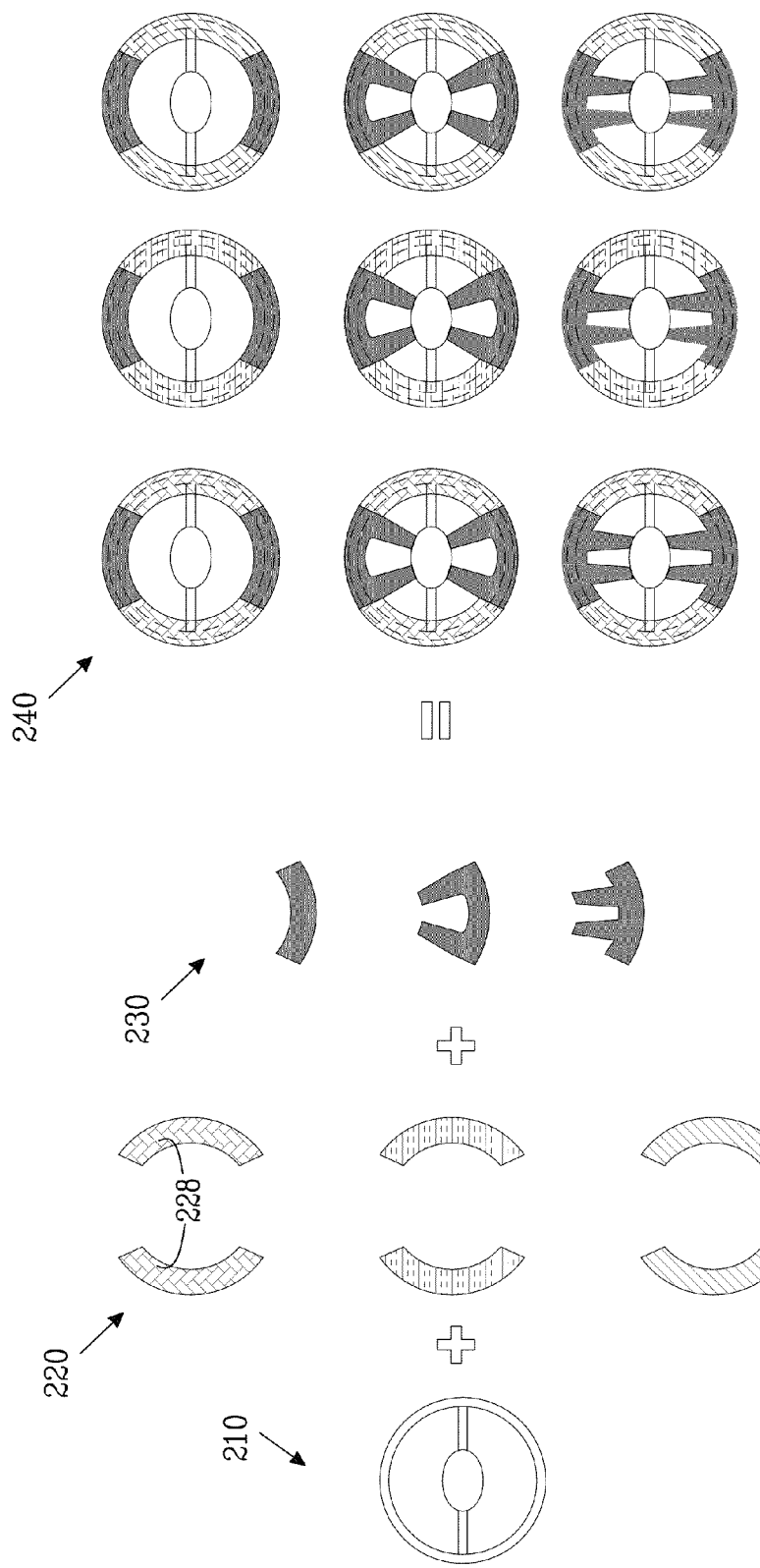
FIG. 6 is a system for steering wheel engineering according to a third embodiment of the invention.

A particular manufacturer or dealer may choose to only have a subset of the total set, as illustrated for FIGS. 5 and 6. It is then possible deliberately choose a subset, wherein all armatures 10 are combinable with all rim interface component variants 20 and all insert component variants 30, thus achieving an as high number of combinations as possible for as few number of components as possible. The subset in itself then represents a system according to the invention.

FIG. 5 illustrates a system for steering wheel engineering according to a second embodiment of the invention. In this case i=1, j=3, and k=3. The three rim interface component variants 120 are, purely as an example, leather, wood and sport. The three insert component variants 130 are adapted to be attached between the inside of the wheel rim and the hub 12. The second insert component variant 134 is, as a matter of fact, two of the first variant 132. Therefore, in this case, 1×3×3=9 different combinations may be formed of 1+3+2=6 different components.

FIG. 6 illustrates another system for steering wheel engineering according to a third embodiment of the invention. In this case i=1, j=3, and k=3. The three rim interface component variants 220 are, just as for FIG. 5, leather, wood and sport. In this case, the rim interface component comprises two members 228. These are to be combined with any of the three insert component variants 230. Since the rim interface component 220 comprises two members 228, it is intended to use two insert component variants 230. Therefore, in this case, 1×3×3=9 different combinations may be formed of 1+3+3=7 different components.

The armature 10 may further comprise a foamed sheath (not illustrated) formed on the wheel rim skeleton 14. In that case, the foamed sheath may form the basis for the rim interface component 20, i.e. the rim interface component 20 is attached on top of the foamed sheath. By using different designs for the foamed sheath, one wheel rim skeleton 14 may be used to make different armature variants 10, e.g. one with a smaller diameter and one with larger diameter. Smaller and larger here mean in comparison to each other. In that case, the rim interface components 20 need to be adapted, so that they fit on the respective armature variants 10, e.g. by having one subset of rim interface components 20 with a small diameter and one with a large diameter. In such a system, all rim interface components will therefore not fit with all armature variants. However, there should preferably be more than one interface component fitting to each armature variant.

An example of a system using a foamed sheath according to a fourth embodiment of the invention:
Armature: i=2, small and large diameter
Rim interface component: j=6, leather, wood and sport for small and large diameter respectively.
Insert component: k=6, corresponding to the insert components of FIG. 1, adapted to small and large diameter respectively.
Number of possible combinations: 1×3×3+1×3×3=18.
Number of components: 2+6+6=14.
However, in this system, it would be possible to use only one wheel rim skeleton 14. Since the wheel rim skeleton 14 is expensive to develop and/or to produce, the exemplary system is beneficial from a cost point of view.

Further modifications of the invention within the scope of the appended claims are feasible. As such, the present invention should not be considered as limited by the embodiments and figures described herein. Rather, the full scope of the invention should be determined by the appended claims, with reference to the description and drawings.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A set of interchangeable components for attachment to a steering wheel armature having a hub, a rim skeleton, and one or more armature spokes connecting the hub with the rim skeleton, the set comprising:
    a first and a second rim interface component interchangeable with one another and alternatively attachable to the rim skeleton to cover a first circumferential arc of the rim skeleton; and
    a first and a second insert component interchangeable with one another and alternatively attachable to the steering wheel armature to cover a second circumferential arc of the rim skeleton separate from the first circumferential arc, at least one of the first and second insert components comprising an extra spoke that, when the at least one insert component is attached to the steering wheel armature, is at a circumferential location separate from the one or more armature spokes.

2. The set according to claim 1, wherein the first rim interface component comprises two members separated by at least one of the first and second insert component.

3. A set of interchangeable components for attachment to a steering wheel armature having a hub, a rim skeleton, and one or more armature spokes connecting the hub with the rim skeleton, the set comprising:
    a first rim interface component attachable to the rim skeleton to cover a first circumferential arc thereof;
    a second rim interface component having an appearance different from that of the first rim interface component and attachable to the rim skeleton alternatively to the first rim interface component to cover the first circumferential arc of the rim skeleton;

a first insert component attachable to the steering wheel armature to cover a second circumferential arc of the rim skeleton separate from the first circumferential arc; and a second insert component having an appearance different from that of the first insert component and attachable to the steering wheel armature alternatively to the first insert component to cover the second circumferential arc of the rim skeleton;

wherein at least one of the first and the second insert component comprises an extra spoke that, when attached to the steering wheel armature, is located at a circumferential position separate from the one or more armature spokes, and wherein all possible combinations of the first or second rim interface component and the first or second insert component have geometrically complementary shapes.

4. The set according to claim 3, wherein the rim interface component and the insert component essentially covers the rim skeleton from view when the steering wheel is being used.

5. The set according to claim 3, wherein a selected one of the first or second rim interface component attached to the rim skeleton and a selected one of the first or second insert component attached to the steering wheel armature together form substantially 100% of a rim surface of the steering wheel that is viewable when the steering wheel is being used.

6. The set according to claim 5, wherein the selected one of the first or second insert component forms between 2% and 10% of the rim surface of the steering wheel armature that is viewable when the steering wheel armature is being used.

7. The set according to claim 5, wherein the selected on of the first or second rim interface component forms between 50% and 100% of the rim surface of the steering wheel armature that is viewable when the steering wheel is being used.

8. The set according to claim 3, wherein at least one of the first and second interface components comprises two members separated by at least one of the first and second insert component.

* * * * *

UNITED STATES PATENT AND TRADEMARK OFFICE
CERTIFICATE OF CORRECTION

PATENT NO.        : 8,881,621 B2
APPLICATION NO.   : 13/024636
DATED             : November 11, 2014
INVENTOR(S)       : Daniel Bodebratt et al.

It is certified that error appears in the above-identified patent and that said Letters Patent is hereby corrected as shown below:

In the Claims,

Column 10, Line 11, Claim 7:

After "wherein the selected"
Delete "on" and
Insert -- one --.

Signed and Sealed this
Twenty-fourth Day of March, 2015

Michelle K. Lee
*Director of the United States Patent and Trademark Office*